United States Patent [19]

Spils

[11] Patent Number: 4,504,040
[45] Date of Patent: Mar. 12, 1985

[54] MULTIPLE STAGE VALVE
[76] Inventor: Richard W. Spils, 1900 Wildwood La., Anchorage, Ak. 99503
[21] Appl. No.: 390,746
[22] Filed: Jun. 21, 1982

Related U.S. Application Data

[63] Continuation of Ser. No. 165,694, Jul. 3, 1980, Pat. No. 4,363,464.
[51] Int. Cl.³ .............................................. F16K 47/04
[52] U.S. Cl. ..................................... 251/121; 251/127
[58] Field of Search ............... 251/120, 127, 121, 118; 137/625.3, 625.34

[56] References Cited

U.S. PATENT DOCUMENTS

| | | | |
|---|---|---|---|
| 1,275,831 | 8/1918 | Barrett | 251/120 |
| 1,640,194 | 8/1927 | Klinzing | 251/120 X |
| 3,485,474 | 12/1969 | Baumann | 251/121 |
| 3,637,188 | 1/1972 | Ung | 251/266 |

FOREIGN PATENT DOCUMENTS 520187  3/1931  Fed. Rep. of Germany ...... 251/120

Primary Examiner—Arnold Rosenthal
Attorney, Agent, or Firm—Klarquist, Sparkman, Campbell, Leigh & Whinston

[57] ABSTRACT

A multiple stage valve wherein the valve body provides plural axially spaced seats defining at least in part a flow passageway. A valve member is disposed in said passageway and has plural spaced valve elements cooperatively related to said plural seats. One or more webs on said valve member establish a guided relationship of said valve member to said seats at assembly, during operation, and in relation to fluid flow.

2 Claims, 11 Drawing Figures

MULTIPLE STAGE VALVE

This application is a continuation of my copending application entitled ANGLE GLOBE VALVE, Ser. No. 165,694, filed July 3, 1980, now Pat. No. 4,363,464, dated Dec. 14, 1982. Benefit of the filing date of the original application is hereby claimed.

The present invention relates to multiple stage high pressure valves for handling fluids, more commonly liquids, but also gases, or sometimes a mixture of the two. To meet increasingly sophisticated problems, industry has insisted on higher and higher pressures. This has been accompanied by a greater range of problems in handling higher pressure drops and fluid velocities.

Multiple stage valves of the type under consideration have achieved fluid control by employing either radial flow through plural multistage orifices, or axial flow through a labyrinth path.

The latter type, to which the present invention relates, had had inconsistent flow patterns of the fluid when passing through the valve, has been difficult to assemble, and has poor physical guidance of the movable valve member.

SUMMARY

The present invention overcomes the above problems by providing a multiple stage valve wherein the valve member is so formed as to insure proper flow patterns of the fluid being controlled, is easy to assemble, and provides proper mechanical guidance of the valve member.

More particularly, the valve means has a series of radially and longitudinally extending webs to accomplish the above functions.

A main object of the invention is to provide a multiple stage valve wherein the valve member is so configured as to achieve the above aims. Various other objects of the invention will be apparent from the following description taken in connection with the accompanying drawings, wherein:

FIG. 1a is a fragmentary view of a portion of FIG. 1;

FIG. 1b is a cross section through the plug;

Figure 1:
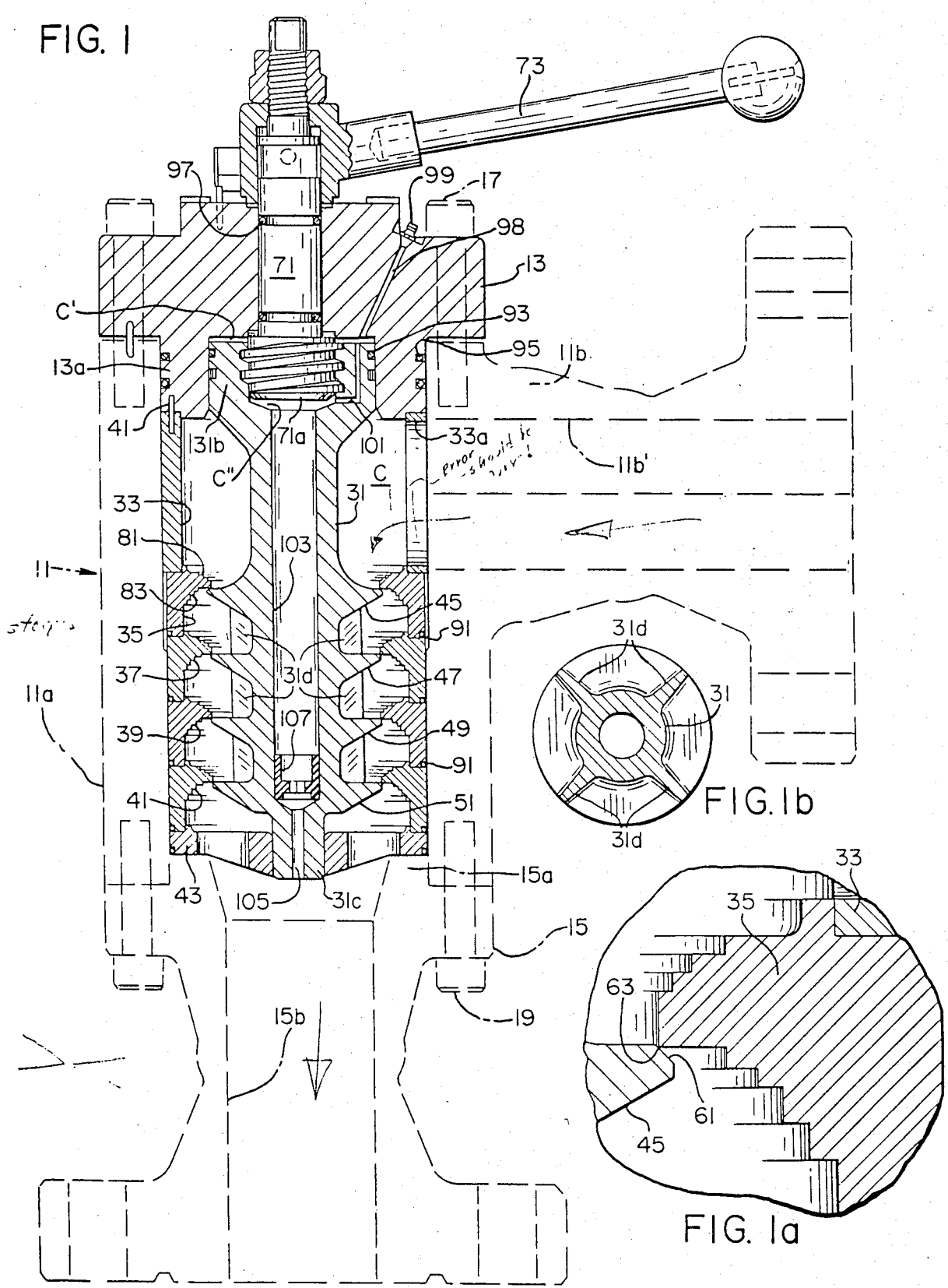
FIG. 1 is a vertical midsection through an angle globe valve of my invention, showing the valve closed.

The FIG. 1 angle valve has a body 11 disposed between a bonnet flange 13 and an outlet flange 15, the flanges being secured to the body by bolts 17 and 19 respectively. The body and the outlet flange are of conventional form, and thus are shown in broken lines. The bonnet is of slightly modified form, while the interior parts are new, so that these are shown in solid lines. The bonnet flange and interior parts may be considered as a kit for converting an existing valve to one of my design. Of course, an original valve of my design may be produced utilizing both the broken and solid lined parts of FIG. 1.

The body 11 commonly has an upright cylindrical portion 11a from which an integral inlet flange portion 11b projects at right angles. Within the cylindrical portion 11a is a stack of rings, encircling a valve member in the form of a plug 31, which is designed to move vertically, as the parts are shown in FIG. 1. The ring stack includes a spacer tube 33, four stage rings 35, 37, 39 and 41, and a spider guide ring 43.

This ring stack is clamped between a boss 15a on outlet flange 15, and a boss 13a on the bonnet flange 13. The combined height of the ring stack and the bosses is slightly greater than that of the cylindrical portion 11a to facilitate the clamping relationship. In order to properly orient an inlet portion 33a of the spacer tube 33 with the inlet passage 11b of the inlet flange portion 11b, an alignment pin 41 is provided. It fits in appropriate bores formed in opposing faces of the boss 13a and the tube 33.

The plug 31 is formed with a series of annular flanges or flaring steps 45, 47, 49 and 51, spaced like the rings 35-41, and cooperatively related to said rings. The upper step has a hardened beveled edge 61 (FIG. 1a) seating against an edge 63 of the ring 35, while the diameters of the other steps are just slightly less than the interior diameters of the associated stage rings so as not to interfere with good seating contact at 61-63. The plug 31 may be moved vertically from its closed position in FIG. 1 to its fully opened position in FIG. 2 or at any position therebetween. In its fully opened position, a labyrinth path P (FIG. 2) is provided by which high pressure fluid in the cavity or chamber C, defined by the spacer tube 33, is decreased in stages from that in the cavity, to a lower pressure in the outlet passage 15b of the outlet flange 15.

If the vertical axial movement of the plug 31 is achieved by an axially moving stem, greater sealing problems are presented than with a turning stem. I achieve the advantages of a turning stem, with axial plug movement, by providing a motion conveting mechanism within the valve body.

Figure 2:
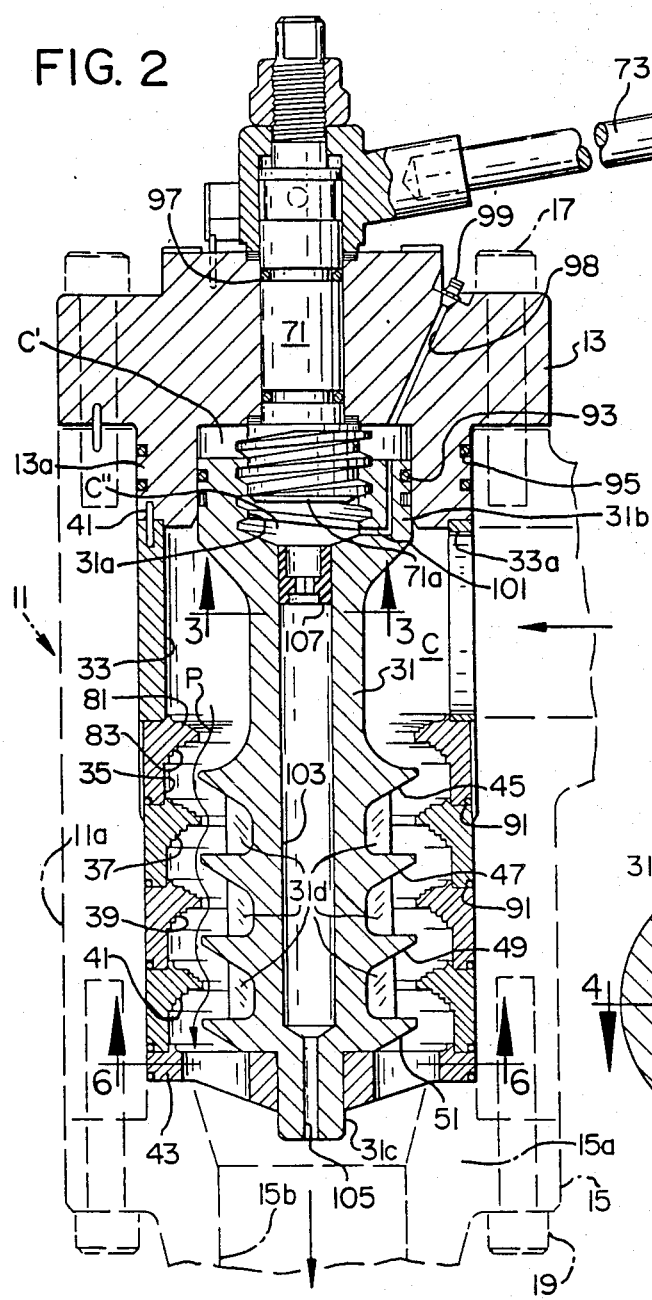
FIG. 2 is a view like FIG. 1 but with the valve fully open.

Referring to FIG. 2, the valve has a turnable valve stem 71 projecting through a bore in the bonnet flange 13. The stem is turned by a handle 73 fixed to the stem, or optionally the stem may be turned by any other device, powered or otherwise.

Figure 6:
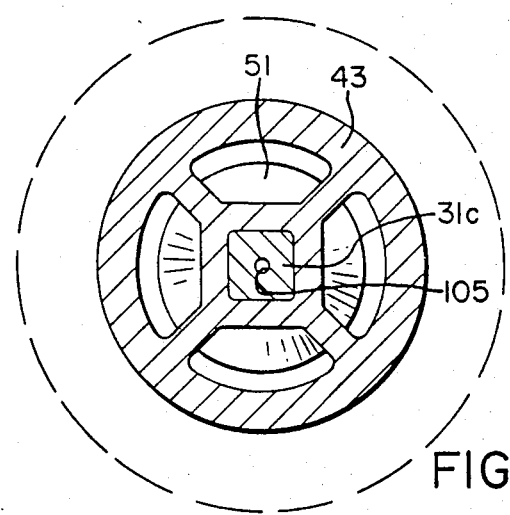
FIG. 6 is a cross section taken along lines 6—6 of FIG. 2.

The motion converting mechanism includes the lower end of the stem which is lead-screw threaded at 71a (FIG. 2) to threadedly engage female threads 31a formed in an enlarged upper end 31b of the plug 31. The lower end of the plug has a non-circular stub 31c (FIGS. 2 and 6) slidably but non-rotatably received in a central bore provided by the spider guide ring 43.

The guide ring is held against turning movement by being clamped against boss 15a. Hence, as handle 73 is turned, causing relative movement between the threaded stem portion 71 and the threads on the plug 31, the plug is moved downwardly an extent depending on the amount the handle is turned. Preferably, the threads 71a are so designed that slightly less than 360 degree movement of the handle will shift the plug from its fully closed to its fully opened position.

Each stage ring may be considered as comprising a ring portion and an inwardly extending annular flange, each of which has an upstream face, a downstream face and an intermediate face. Each upstream face is formed with plural upper stepped portions or ridges 81 and each downstream face is formed with plural steped portions or lower ridges 83. These ridges create turbulent flow and thus good frictional contact between the flowing fluid and the stage rings. This effects a transformation of the kinetic energy of the fluid into heat energy, which is carried away by the fluid passing through the valve.

Note that the two stage ring ridges closest the controlling edge of the respective plug step participate in the control of the fluid flow, to accomplish double orificing at each stage of the valve.

When the plug 31 is moved to its closed position, a fluid seal is provided at the seat 61. I provide a series of O-ring seals 91 to prevent fluids from bypassing the seat 61, by traveling downwardly between the exterior surfaces of the stage rings and the interior surface of the body 11, and entering the flow passage at any of the meeting faces of the stage rings, with one another or with the guide ring, or entering between the meeting faces of the guide ring and the boss 15a. I provide other O-ring seals 93 between the large, what might be termed piston, portion of the plug 31 and the opposed surfaces of the boss 13a. Still other O-ring seals are provided at 95 and 97 to prevent leakage.

I provide means for lubricating the threaded connection at 71a-31a. This includes a drilled hole 98 (FIG. 2) through the bonnet flange 13. A grease fitting 99 is provided at the upper end of the hole to enable grease to be pumped through the hole and into a cavity C' above the plug. A hole 101 is provided in the upper end of the plug in bypassing relation to the threaded stem portion 71a so that grease can be supplied to a cavity C" in the plug and have access to the threads 31a. Preferably the hole 101 is formed in the lower end of the stem rather than in the plug, because it can be more readily formed in the stem.

When the plug is moved downwardly, the cavities C' and C" enlarge. To accommodate this change in volume I provide a central bore 103 within the plug, communicatat one end with the cavity C", and at its other end with the outlet passage 15b via a small bore 105. A rubber plug 107 is slidably received by the bore 103 to separate the grease in the cavities C' and C" from the fluid being controlled by the valve.

Figure 3:
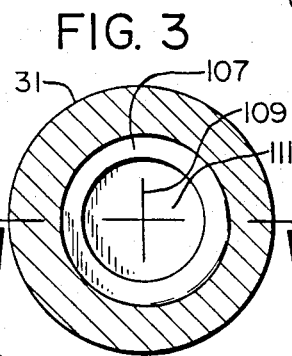
FIG. 3 is a cross section taken along line 3—3 of FIG. 2.
Figure 5:
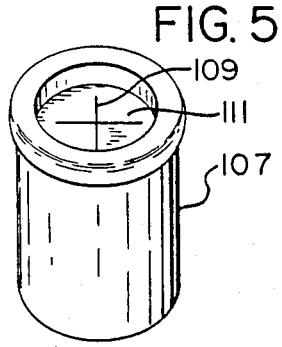
FIG. 5 is a perspective view of the plug.
Figure 4:
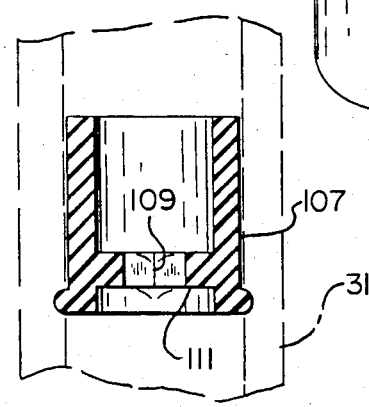
FIG. 4 is an enlarged fragmentary view of the lubricant sealing plug.

With the plug 31 in its closed position, grease is pumped into the chambers C' and C" forcing the plug 107 downwardly until it seats at the lower end of the bore 103. The plug has a cross slit 109 (FIG. 3) in a central flange 111. When the plug reaches the lower end of its travel and further grease is injected to make sure that the plug is fully down, the excess can force its way through the slit and into the bore 105.

Now, as the plug is lowered and the cavities C' and C" enlarge, the plug 107 will be forced upwardly by the fluid pressure beneath it, to fill the larger cavities with grease. When the plug is closed, the grease in the cavities is expelled therefrom forcing the plug 107 downwardly to the FIG. 1 position.

The bores 103 and 105 and the cavity C" provide a balanced pressure plug in that the pressure in the outlet passage 15b is transmitted by the bores and cavities to the upper face of the plug. The diameter of the piston portion 31b of plug 31 is made smaller than the inside diameter of the rings 45-51, to achieve a net axial downward force on the plug to make for stable plug positioning.

Preferbly I provide plural flanges or webs 31d (FIG. 1b) on the plug 31 which function as vertical flow dividers between the plug steps. They prevent vortexing flow, serve as alignment guides in assembly, and stiffen the plug.

The flanges or webs 31d thus assure against lateral turbulence of the fluid passing through the valve, i.e., assure that fluid entering between a pair of webs 31d travels through the valve in an aligned condition with respect to the space between such webs.

These flanges or webs also make for ready assembly of the valve in that they have a guiding engagement with the inner edges of the seat steps. Otherwise, when inserting the plug in the valve at assembly time, without the webs 31d, the flaring steps of 45, 47, 49 and 51 would catch on the seat rings and make assembly difficult. The webs, however, guide the valve member into the flow passageway provided by the seat rings, in such a guided relationship that catching up or interference between the flaring steps on the plug and the seats provided by the stage rings does not occur.

Also, during operation, when the plug or valve member is moved upwardly and downwardly, the peripheral edges of the webs 31d engage the inner edges of the seat rings to insure travel of the valve member or plug without catching up on the inner edges of the stage or seat rings.

Figure 7:
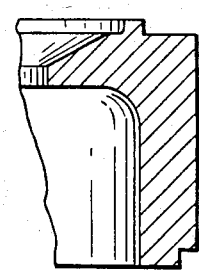
FIGS. 7-9 are fragmentary section through stack rings of other configurations.
Figure 8:
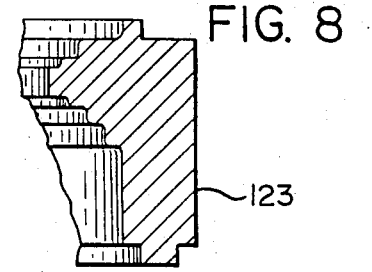
Figure 9:
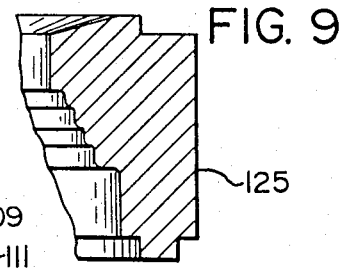

FIGS. 7, 8 and 9 show optional forms of stage rings 121, 123 and 125 to achieve different types of turbulence. These rings may be used as a stack of stage rings all of a kind, or intermixed to achieve desired results.

While I preferably utilize a motion converting mechanism as described previously herein, to avoid the sealing problems of an axially movable stem, I point out that with my balanced plug concept, my valve can readily adapt to many fields of activity, particularly certain oil field uses, which to a considerable extent require axially movable plugs. Thus, in such installation, the plug 31 will be removed and replaced by either an integral plug-stem unit or by a plug stem assembly, articulatedly connected together. Note that the balanced plug concept is retained, because the replacement plug will be suitably drilled and bored to provide this feature.

An advantage of stack ring concept, not pointed out previously, is that the rings and plug may be cast, since the only machining required is at the metal-to-metal contacting surfaces. The roughness of a cast surface aids in creating turbulence, so it is beneficial to the action of the ridges 81 and 83.

What is claimed is:

1. A multiple stage valve comprising:
   a body having plural seat members arranged in spaced relation along a predetermined axis and having first portions closer to said axis than other portions,
   said seat members at least in part defining a flow passageway providing between said first portions spaced chambers larger than said first portions,
   a coaxially related valve member in said passageway having plural spaced valve elements for cooperative action with said seat members,
   said valve elements being capable of dropping into said chambers during assembly,
   a guide ring beyond said seat members having a centering hole,
   and guidance means on said valve member for engaging said seat members and keeping the valve elements from dropping into said chambers during assembly and for guiding said one end of said valve member into said centering hole, said guidance means comprising plural webs extending radially and longitudinally for aiding in directing fluids flowing through said valve to move in a generally axial direction, rather than circumferentially, for aiding in assembly of the valve member into the valve body, and for guiding said valve member in its movement relative to said seat members, at least one of said webs being located on the periphery of said valve member and extending continuously and uninterruptedly to span the gaps between said valve elements.

2. A multiple stage valve as recited in claim 1, wherein said valve member, including said webs, comprises a single integral component.

* * * * *